Oct. 6, 1964 J. H. McCAULEY ETAL Re. 25,655

INDICATOR TUBES

Original Filed May 22, 1958

INVENTORS
CARL W. ERICSON
JOHN H. McCAULEY
BY JOHN R. BETHKE
Fidler, Bradley & Patnaude
Attys United States Patent Office Re. 25,655
Reissued Oct. 6, 1964

25,655
INDICATOR TUBES

John H. McCauley, Union County, and John R. Bethke, Somerset County, N.J., and Carl W. Ericson, Orange, Calif., assignors to Burroughs Corporation, Detroit, Mich., a corporation of Michigan Original No. 2,906,906, dated Sept. 29, 1959, Ser. No. 737,036, May 22, 1958. Application for reissue Oct. 3, 1963, Ser. No. 314,092
13 Claims. (Cl. 315—136)

Matter enclosed in heavy brackets [ ] appears in the original patent but forms no part of this reissue specification; matter printed in italics indicates the additions made by reissue.

This invention relates to gaseous indicator glow tubes and, particularly, to tubes of this type which contain a plurality of indicating glow cathodes.

Tubes of the type contemplated by the present invention are particularly suited for use with circuits which utilize binary principles of operation. Binary counters which use a series of interconnected flip-flop circuits are of this type. Such decade counters generally employ a matrix for translating a signal representing a binary number to a signal representing a decimal or other number equivalent of the binary number. Up to the present time, counters of this type have not had a completely satisfactory arrangement for providing direct readout of a count made by the counting circuit.

Accordingly, one object of the invention is to provide an improved cathode indicator glow tube.

Another object of the invention is to provide an improved cathode indicator glow tube particularly suited for use in conjunction with binary-type counting circuits and for providing a direct visible readout therefrom.

In brief, the principles and objects of the invention are embodied in a tube which comprises a gas-filled envelope containing a plurality of cathode glow electrodes. If, for example, the tube is to be used in a decade counter, it contains cathodes in the form of numerals "0" to "9." The cathode glow electrodes are arranged in groups with each group having its own anode and with the groups separated from each other by a suitable barrier or shield. For use in a binary-coded system, the cathode electrodes are arranged in two groups with the odd-number electrodes in one group and the even-number electrodes in the other group. Other combinations of cathode electrodes may be made as required by a particular code or circuit application. In addition, more than two groups of electrodes may be provided so that a simultaneous readout of a plurality of characters may be achieved.

In operation of a tube of the type described above, a single cathode in a group may be caused to glow by the application of the proper energizing voltage between the selected cathode and the anode associated with this cathode. The shield prevents interaction between the groups of electrodes and spurious glow of a cathode other than the selected cathode.

According to another aspect of the invention, multiple groups of cathodes are provided in a single envelope and are electrically connected so that a plurality of cathodes may be caused to glow at the same time to provide a multiple numeral readout.

The invention is described in greater detail by reference to the single sheet of drawings wherein.

Figure 1:
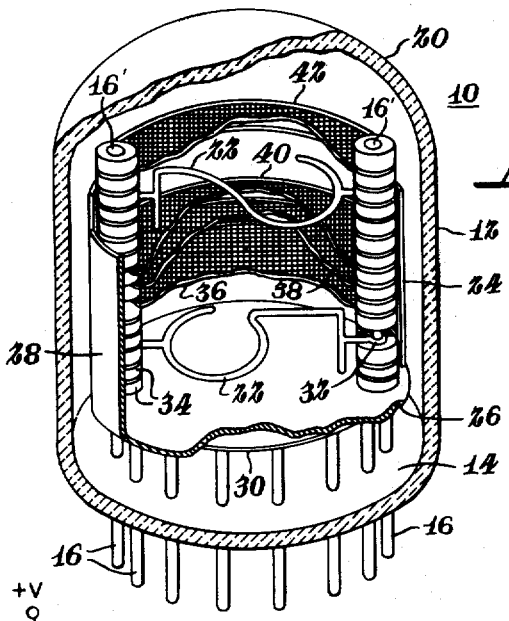
FIG. 1 is a perspective view of a tube embodying the invention.

Referring to the drawings, one form of a gaseous indicator glow tube 10 embodying the invention includes an envelope 12 which has been evacuated of air and filled with an ionizable gas such as neon or the like at a suitable pressure, for example, in the range of about 40 to about 120 mm. Hg. The envelope includes a base portion or stem 14 through which insulation-coated metal base pins 16 extend and by means of which electrical connection is made to suitable external electrical circuit elements. Two diametrically opposed pins 16' are suitably elongated to receive and support the various electrode elements of the tube. The envelope 12 also includes a transparent viewing window 20 through which glowing indicator cathode electrodes 22 may be viewed. The viewing window may be plane or curved and is oriented substantially transversely to the vertical or longitudinal axis of the tube. A sealed-off exhaust tubulation (not shown) is provided in the stem 14.

The electrode elements of the tube include the following. A generally cup-shaped electrode 24 is provided to contain the other electrode elements. The cup-shaped electrode 24 is made of conductive or non-conductive material, depending on how it is to be used, and may be imperforate, in mesh form, or in any other suitable form. The cup electrode serves to shield the cathode electrodes 22 and to limit cathode glow to the main viewable body portions of the cathode numbers themselves. The cup also prevents the cathode pins and connecting leads from glowing spuriously and from having metal sublimed thereon. The cup electrode 24 includes a base 26 and a peripheral wall 28. The base 26 is oriented transverse to the longitudinal axis of the tube 10. The cup 24 rests on, and is insulated from, the pins 16 by an insulating disk 30 of mica or the like. The pins 16' pass through suitable apertures in the base of the cup and in the mica disk. Although the cup 24 is a desirable tube element, it is not required, and the tube 10 may be made to operate without it.

The cathode indicator electrodes 22 of the tube 10 may take substantially any desired shape; for example, they may be numbers, letters, or the like. In one form of the tube 10 wherein the cathode elements are numbers, ten of such elements are provided, including the numbers "0" to "9." These are shown schematically in FIG. 2. For purposes of simplicity, only two cathodes are shown in FIG. 1. The cathode elements 22 are made of any suitable metal, for example, stainless steel, aluminum, Nichrome, molybdenum, or the like; and they may be made in any suitable fashion, for example, by etching, stamping, formed wire, or the like.

The cathode electrodes 22 are mounted in a vertical stack having a vertical axis and are oriented substantially parallel to each other and facing the viewing window 20. The cathodes are made of suitably shaped and sized material and are suitably displaced laterally with respect to each other so that each one is not obstructed by the others and each is substantially completely visible through the viewing window 20.

According to the invention, the cathodes are arranged in groups, axially aligned one above the other. Depending on the code or circuit in which the tube is to be used, the cathodes may be arranged in two or more groups or stacks with the numbers in each group being selected to satisfy the selected code. The tube shown in FIG. 1 and the following description relate to a tube having two axially aligned groups of electrodes, the even-number electrodes in one group and the odd-number electrodes in the other group.

The cathode elements 22 are provided with apertured tabs 32 (only one is shown), at least two in number and oriented diametrically opposite each other, by means of which the cathodes are mounted and supported on the pins 16'. Each cathode is provided with a suitable lead wire (not shown) extending from one of the apertured tabs thereof to one of the pins 16 within the envelope. One group of cathodes, for example, the odd-numbers, is mounted first on the pins or posts 16'. These cathodes are mounted one above the other with their surfaces oriented parallel to each other and transverse to the vertical axis of the tube and facing the viewing end of the envelope. The cathodes are mounted with suitable insulating spacers 34 between each one, the spacers being larger than the apertured tabs and having sufficient surface area to cover and insulate the tabs to prevent them from glowing.

Next, three screen electrodes 36, 38, and 40 are mounted above the odd-number cathodes, the screens being parallel to each other and insulated from each other by suitable insulating spacers 34. The screens also have suitable apertured tabs, *or are simply apertured without having any tabs,* for mounting on the pins 16', and lead wires for making suitable electrical connections to pins 16. The first screen 36 comprises an anode for the odd-number cathodes, and the third screen 40 is an anode for the even-number cathodes. The middle screen 38 is a shield which separates the two groups of electrodes from each other. The even-number cathodes are mounted above the anode screen 40, and finally a top screen 42 caps the stack of electrode elements. The top screen is used to prevent sublimation of metal from the cathodes onto the viewing window 20 which might thereby become opaque.

Figure 3:
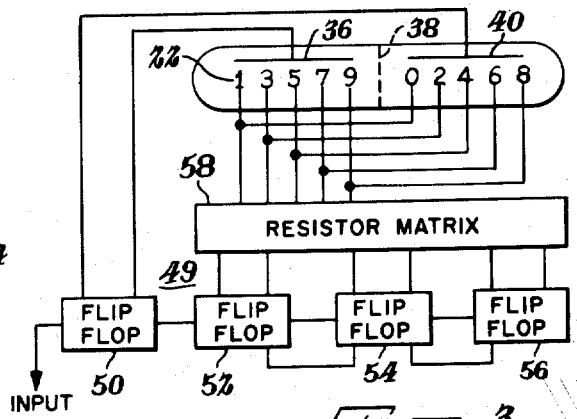
FIG. 3 shows the tube of FIG. 2 and a schematic representation of a system in which it may be used.

[If] *As shown in FIG. 3, if* the tube 10 is to be used in a binary-type decade counter using flip-flop circuits, then the cathodes are connected together in pairs, the pairs comprising, for example, zero and one, two and three, four and five, six and seven, eight and nine. The interconnections may be made in any suitlable fashion; for example, each cathode 22 may be connected to a pin 16 and the appropriate pins may be connected together inside the envelope or outside the envelope. In another arrangement, the leads from each two cathodes to be connected together may be secured directly to the same pin inside the envelope. In another arrangement, the socket to be used with the tubes may be wired to provide the desired cathode pairs.

Each anode screen 36 and 40 is connected to its own pin lead 16, just as the cathodes are. The shield screen electrode 38 may also be connected to a pin 16 and may be operated electrically neutral or at some suitable potential. The cup 24 may also be operated either neutral or it may be connected to the shield screen 38 and thus operated at the same potential as this screen. The top screen 42 may be connected to the shield screen 38 to be operated at the same potential as the screen.

Figure 2:
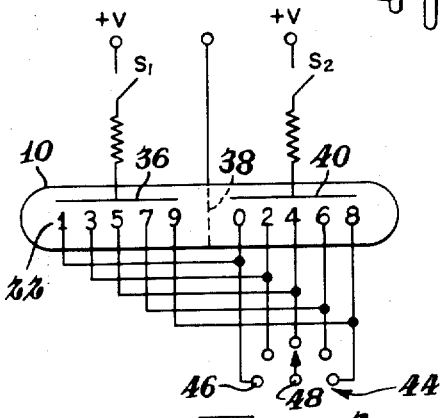
FIG. 2 is a schematic representation of the tube of FIG. 1 and a circuit in which it may be operated.

A schematic representation of the tube 10 and a typical circuit for operating it is shown in FIG. 2. In the circuit, the appropriate cathode numbers 22 are shown connected together in pairs, the pairs, in this instance, comprising zero and one, two and three, four and five, six and seven, eight and nine. The circuit also includes a selector switch 44 having five fixed switching elements or contacts 46 and a movable contactor 48 adapted to engage any of the fixed contacts. The selector switch may be a mechanical or electronic switch controlled or driven from a keyboard, from a circuit matrix associated with a counter, or it may be driven in any other suitable manner. Each pair of cathodes is connected to one fixed contact of the switch 40. Each anode 36 and 40 is coupled *through a switch* $S_1$ or $S_2$ to a suitable positive D.C. power supply in the range of about 100 volts to about 300 volts. The shield screen 38 may be biased from ground to about 100 volts positive.

In operation of the circuit of FIG. 2, as each pair of cathodes 22 is connected into an active circuit by the contactor 48, one of the cathodes of each pair glows, depending on which anode is energized by the circuit. Thus, the even-number cathodes glow when anode 40 is energized *by switch* $S_2$ *and potential source* $+V$, and the odd-number cathodes glow when anode 36 is energized *by switch* $S_1$ *and potential source* $+V$, *which may be the same or a different source of supply voltage.*

A typical binary-coded decimal counter system 49 in which the tube 10 may be employed is shown in block diagram in FIG. 3. The counter shown includes four flip-flop circuits 50, 52, 54, 56 connected to provide a typical counting operation. Input pulses are fed into the first flip-flop circuit 50, and the output of the first flip-flop is connected both into *flip-flop 52 of* the counting chain and to the anodes 36 and 40 of the tube 10. The output lines of the flip-flop circuits 52, 54, and 56 are fed into a suitable selector *resistor* matrix 58 where the numerical count is determined and the output of the matrix is applied to the proper cathodes of the tube. Thus, in essence, the output of the matrix energizes a particular [cathode in a pair] *pair of cathodes* and the flip-flop 50 energizes a particular anode so that the proper cathode of the pair is ignited.

Figure 4:
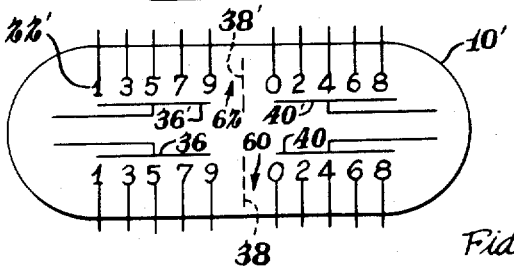
FIG. 4 is a schematic representation of a modified tube embodying the invention adapted to provide a multiple numeral readout.

The principles of the invention may also be embodied in a tube which includes more than two sections or groups of electrodes. Such a tube 10' is shown schematically in FIG. 4 and comprises, in effect, two tubes of the type shown in FIG. 1 in the same envelope. The tube 10' comprises one set of electrodes 60 including the electrodes shown in FIG. 2 and a second set of electrodes 62 which may be arranged similarly to the first set and includes cathodes 22', anodes 36' and 40' and a shield 38'. The tube 10' may be operated so that one cathode in each set glows at the same time and, thus, a two-numeral read-out is achieved.

What is claimed is:

[1. An andicator tube comprising a first indicator cathode adapted to glow and a second indicator cathode adapted to glow, an anode associated with each of said cathodes, and a shield electrode between each of said cathodes and its associated anode.]

[2. The tube defined in claim 1 wherein all of the electrodes are aligned in a common stack.]

[3. The tube defined in claim 1 wherein said cathodes are electrically connected.]

[4. An andicator tube comprising a first group of indicator cathodes adapted to glow and a second group of indicator cathodes adapted to glow, an anode associated with each of said groups of cathodes, and a shield electrode between each of said groups of cathodes and its associated anode.]

[5. The tube defined in claim 4 wherein all of the electrodes are oriented parallel to each other and aligned in a common stack.]

6. An indicator tube comprising *a closed envelope containing a gaseous atmosphere and* a first stack of indicator cathodes adapted to glow, an anode electrode at the top of said first stack, a second stack of indicator cathodes adapted to glow, an anode electrode at the bottom of said second stack, said stacks being aligned with each other, and a shield electrode between said anodes.

7. The tube defined in claim 6 and wherein each cathode in said first stack is electrically connected to a *different* cathode in said second stack.

[8. An indicator tube comprising a plurality of electrode assemblies, each of said assemblies including a first indicator cathode adapted to glow and a second indicator cathode adapted to glow, an anode associated with each of said cathodes, and a shield electrode between each of said cathodes and its associated anode.]

*9. The tube defined in claim 7 wherein said first and second stacks are aligned to form a common stack, and wherein said envelope includes a viewing window and a base, a plurality of conductive pins extending through said base, a first plurality of electrical conductors within said tube each connecting one cathode from each of said first and second stacks to one of said pins, and a second plurality of electrical conductors within said tube each connecting one of said anodes to one of said pins.*

*10. A cathode glow indicator tube for selectively displaying one of a plurality of characters comprising an envelope, a gaseous atmosphere within said envelope at a pressure capable of sustaining a cathode glow, a plurality of electrode groupings within said envelope each including an anode and a plurality of cathode electrodes shaped in the form of characters to be displayed, a plurality of electrical leads each interconnecting one cathode of each of said groupings, a shield electrode disposed between said electrode groupings for shielding and isolating said groupings from one another, a first plurality of electrical terminals each connected to a different one of said electrical leads, and a second plurality of electrical terminals each connected electrically to one of said anodes, for selectively displaying one of said characters by applying a voltage between a selected one of said first plurality of terminals and a selected one of said second plurality of terminals.*

*11. A cathode glow indicator tube for selectively displaying one of a plurality of characters comprising an envelope having a viewing window and a base, a plurality of conductive pins extending through said base for connection to external circuitry, a gaseous atmosphere within said envelope capable of sustaining a cathode glow, a plurality of electrode groupings within said envelope each including an anode and a plurality of cathode electrodes shaped in the form of characters to be displayed, a conductive shield electrode disposed between said electrode groupings for shielding and isolating said groupings from one another, a first plurality of electrical leads each interconnecting one cathode of each of said groupings to one of said conductive pins, and a second plurality of electrical leads each connecting one of said anodes to a conductive pin, for selectively displaying one of said characters by applying a voltage between a cathode in each of said groupings and a selected one of said anodes.*

*12. A cathode glow indicator tube for selectively displaying one of a plurality of characters comprising an evacuated envelope, a gaseous atmosphere within said envelope capable of sustaining a cathode glow, a plurality of electrode groupings within said envelope each including an anode and a plurality of cathode electrodes shaped in the form of characters to be displayed, a plurality of electrical leads each interconnecting one cathode of each of said groupings, a fine wire conductive shield electrode spaced between said electrode groupings for isolating said groupings from one another, a first plurality of electrical terminals each connected to a different one of said electrical leads, and a second plurality of electrical terminals each connected electrically to one of said anodes, for selectively displaying one of said characters by applying a voltage between a cathode in each of said groupings and a selected one of said anodes.*

*13. A cathode glow indicator tube for selectively displaying one of a plurality of characters comprising an evacuated envelope having a viewing window, a gaseous atmosphere within said envelope capable of sustaining a cathode glow, a plurality of electrode groupings within said envelope each including an anode and a plurality of cathode electrodes shaped in the form of characters to be displayed, means for mounting said cathode electrodes to face the viewing window, a plurality of electrical leads each interconnecting one cathode of each of said groupings, a shield electrode disposed between said electrode groupings for shielding and isolating said groupings from one another, said shield member being positioned on the viewing window side of certain of said cathodes but being transparent to permit the glow of those cathodes to be seen through said window, a first plurality of electrical terminals each connected to a different one of said electrical leads, and a second plurality of electrical terminals each connected electrically to one of said anodes, for selectively displaying one of said characters by applying a voltage between a cathode in each of said groupings and a selected one of said anodes.*

*14. A cathode glow indicator tube for selectively displaying one of a plurality of characters comprising an envelope having a viewing window, a gaseous atmosphere within said envelope capable of sustaining a cathode glow, a plurality of electrode groupings within said envelope each including an anode and a plurality of cathode electrodes shaped in the form of characters to be displayed, means for mounting said cathodes in a stacked arrangement for in-line viewing through said window, a plurality of electrical leads each interconnecting one cathode of each of said groupings, a transparent conductive screen electrode disposed between said electrode groupings intermediate said stack for shielding and isolating said groupings from one another, a first plurality of electrical terminals each connected to a different one of said electrical leads, and a second plurality of electrical terminals each connected electrically to one of said anodes, for selectively displaying one of said characters by applying a voltage between a cathode in each of said groupings and a selected one of said anodes.*

*15. A cathode glow indicator tube for selectively displaying one of a plurality of characters comprising an envelope having a viewing window, a gaseous atmosphere within said envelope capable of sustaining a cathode glow, a plurality of electrode groupings within said envelope each including an anode and a plurality of cathode electrodes shaped in the form of characters to be displayed, a plurality of electrical leads each interconnecting one cathode of each of said groupings, a transparent conductive screen electrode disposed between said electrode groupings for shielding and isolating said groupings from one another, each of said cathodes and said screen member having a pair of mounting apertures spaced apart a predetermined distance, a pair of support posts similarly spaced apart and engaging said mounting apertures, said cathodes being mounted on said posts parallel to one another in a stacked arrangement facing said viewing window, each cathode being electrically insulated from the other cathodes in the same grouping, a first plurality of electrical terminals each connected to a different one of said electrical leads, and a second plurality of electrical terminals each connected electrically to one of said anodes, for selectively displaying one of said characters by applying a voltage between a cathode in each of said groupings and a selected one of said anodes.*

*16. A cathode glow biquinary indicator tube for selectively displaying a decimal numeral 0 to 9 comprising an evacuated envelope having a viewing window and a base, a plurality of conductive pins extending through said base for connection to external circuitry, a gaseous atmosphere within said envelope at a pressure capable of sustaining a cathode glow, two electrode groupings within said envelope each including an anode and five cathode electrodes shaped in the form of decimal numerals, a transparent conductive screen electrode spaced between said electrode groupings for shielding and isolating said groupings from one another, a first plurality of electrical leads each interconnecting one cathode of each of said groupings to one of said conductive pins, a second plurality of electrical leads each connecting one of said anodes to a conductive pin, means for mounting said cathodes and said screen member in a stacked arrangement for in-line viewing through said viewing window when a voltage is applied between a selected one of the anode-connected pins and a selected one of the cathode-connected pins.*

*17. A cathode glow tube as in claim 16 wherein one electrode grouping includes all cathode electrodes shaped as odd-number decimal numerals and the other grouping includes all cathode electrodes shaped as even-number decimal numerals.*

*18. A cathode glow indicator tube for selectively displaying any one of a plurality of characters comprising an envelope having a viewing window, a gaseous atmosphere within said envelope capable of sustaining a cathode glow, two electrode groupings within said envelope*

*each including an anode and a plurality of cathode electrodes shaped in the form of characters to be displayed, a plurality of electrical leads each interconnecting one cathode of each of said groupings, a transparent screen electrode spaced between said electrode groupings for shielding said groupings from one another, support means mounting said cathodes in a stacked arrangement facing said viewing window and said screen electrode in the middle of such stack, a second transparent electrode contiguous one end of said stack intermdeiate the stack and the viewing window, and an opaque electrode contiguous the other end of said stack and surrounding the cathode grouping between such end and the transparent screen electrode.*

*19. A cathode glow indicator for selectively displaying one of a plurality of characters comprising an evacuated envelope, a gaseous atmosphere within said envelope capable of sustaining a cathode glow, a plurality of electrode groupings within said envelope each including an anode and a plurality of cathode electrodes shaped in the form of characters to be displayed, a plurality of electrical leads each interconnecting one cathode of each of said groupings, a conductive shield electrode spaced between said electrode groupings for shielding said groupings from one another, a first plurality of electrical terminals each*

*connected to a different one of said electrical leads, a second plurality of electrical terminals each connected electrically to one of said anodes, a voltage source, and an electrical switching circuit for selectively applying said voltage source to a selected terminal of said first plurality and a selected terminal of said second plurality, to display one of said characters by applying said voltage between a cathode in each of said groupings and a selected one of said anodes.*

References Cited in the file of this patent or the original patent

UNITED STATES PATENTS

| | | |
|---|---|---|
| 2,142,106 | Boswau | Jan. 3, 1936 |
| 2,606,309 | Townsend | Aug. 5, 1952 |
| 2,717,334 | Desch | Sept. 6, 1955 |
| 2,756,366 | Maynard | July 24, 1956 |
| 2,769,939 | Williams | Nov. 6, 1956 |
| 2,790,110 | Applegate | Apr. 23, 1957 |
| 2,990,061 | McCauley | June 27, 1961 |
| 2,996,635 | Kleppet et al. | Aug. 15, 1961 |

FOREIGN PATENTS

| | | |
|---|---|---|
| 126,558 | Russia | Feb. 23, 1959 |